US008666698B2

(12) United States Patent
Mancin et al.

(10) Patent No.: US 8,666,698 B2
(45) Date of Patent: Mar. 4, 2014

(54) AIRCRAFT TAKEOFF WEIGHT CALCULATING METHOD AND SYSTEM

(75) Inventors: Siro Mancin, Samarate (IT); Rosanna Molinaro, Samarate (IT)

(73) Assignee: Agustawestland S.p.A., Samarate (IT)

( * ) Notice: Subject to any disclaimer, the term of this patent is extended or adjusted under 35 U.S.C. 154(b) by 72 days.

(21) Appl. No.: 13/307,806

(22) Filed: Nov. 30, 2011

(65) Prior Publication Data

US 2012/0143485 A1 Jun. 7, 2012

(30) Foreign Application Priority Data

Dec. 1, 2010 (EP) .................................... 10425366

(51) Int. Cl.
*G01G 19/07* (2006.01)
*G01G 19/08* (2006.01)
(52) U.S. Cl.
CPC .............. *G01G 19/07* (2013.01); *G01G 19/086* (2013.01)
USPC .......................................... 702/173; 701/124
(58) Field of Classification Search
CPC ................ G01G 19/07; G01G 19/08
USPC ........................................................ 701/124
See application file for complete search history.

(56) References Cited

U.S. PATENT DOCUMENTS

| 3,469,644 | A | | 9/1969 | Harding |
| 4,490,802 | A | | 12/1984 | Miller |
| 5,229,956 | A | | 7/1993 | Daniell et al. |
| 5,987,397 | A | * | 11/1999 | McCool et al. ............... 702/173 |
| 7,296,006 | B2 | * | 11/2007 | Flynn et al. ..................... 706/37 |

OTHER PUBLICATIONS

IHS Jane's, "Helicopter Power Plant Recording and Monitoring System (PPRMS)", Oct. 9, 2006, pp. 1-3.*
European Search Report dated Mar. 15, 2011 corresponding to European Patent Application No. EP 10 42 5366.

* cited by examiner

*Primary Examiner* — John R Olszewski
*Assistant Examiner* — Todd Melton
(74) *Attorney, Agent, or Firm* — Ohlandt Greeley Ruggiero & Perle, L.L.P.

(57) ABSTRACT

A method of calculating the takeoff weight of an aircraft, characterized by including the steps of: recording a first and second value of a first quantity associated with the weight of the aircraft at least a first and second instant, in which the aircraft is in horizontal flight at constant height; and calculating the takeoff weight of the aircraft on the basis of the first and second value.

11 Claims, 3 Drawing Sheets

AIRCRAFT TAKEOFF WEIGHT CALCULATING METHOD AND SYSTEM

The present invention relates to an aircraft takeoff weight calculating method and system.

BACKGROUND OF THE INVENTION

Aircraft parts are normally subject to fatigue damage in the course of their working life.

Parts subject to severe fatigue damage are designed using a load spectrum corresponding to given flight manoeuvres performed for given lengths of time.

In other words, the most significant parts are fatigue-designed on the basis of the load spectrum, and are issued with a given fatigue life.

A need is felt within the industry to determine the actual in-service fatigue of aircraft component parts, so as to safely determine the residual working life with respect to the fatigue life for which they were designed.

One of the main parameters for calculating the actual fatigue of aircraft component parts is the takeoff weight of the aircraft.

From the takeoff weight, it is possible to work out the weight in various flight conditions, on which the attitudes affecting component part fatigue damage depend.

The takeoff weight of the aircraft is normally calculated by adding the weight of the payload, fuel and crew to the no-load weight of the aircraft.

A need is felt within the industry for a more accurate way of calculating the takeoff weight of an aircraft, so as to more accurately determine the actual fatigue of aircraft component parts.

SUMMARY OF THE INVENTION

It is an object of the present invention to provide a method of calculating the takeoff weight of an aircraft, as claimed in claim 1.

The present invention also relates to a system for calculating the takeoff weight of an aircraft, as claimed in claim 9.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
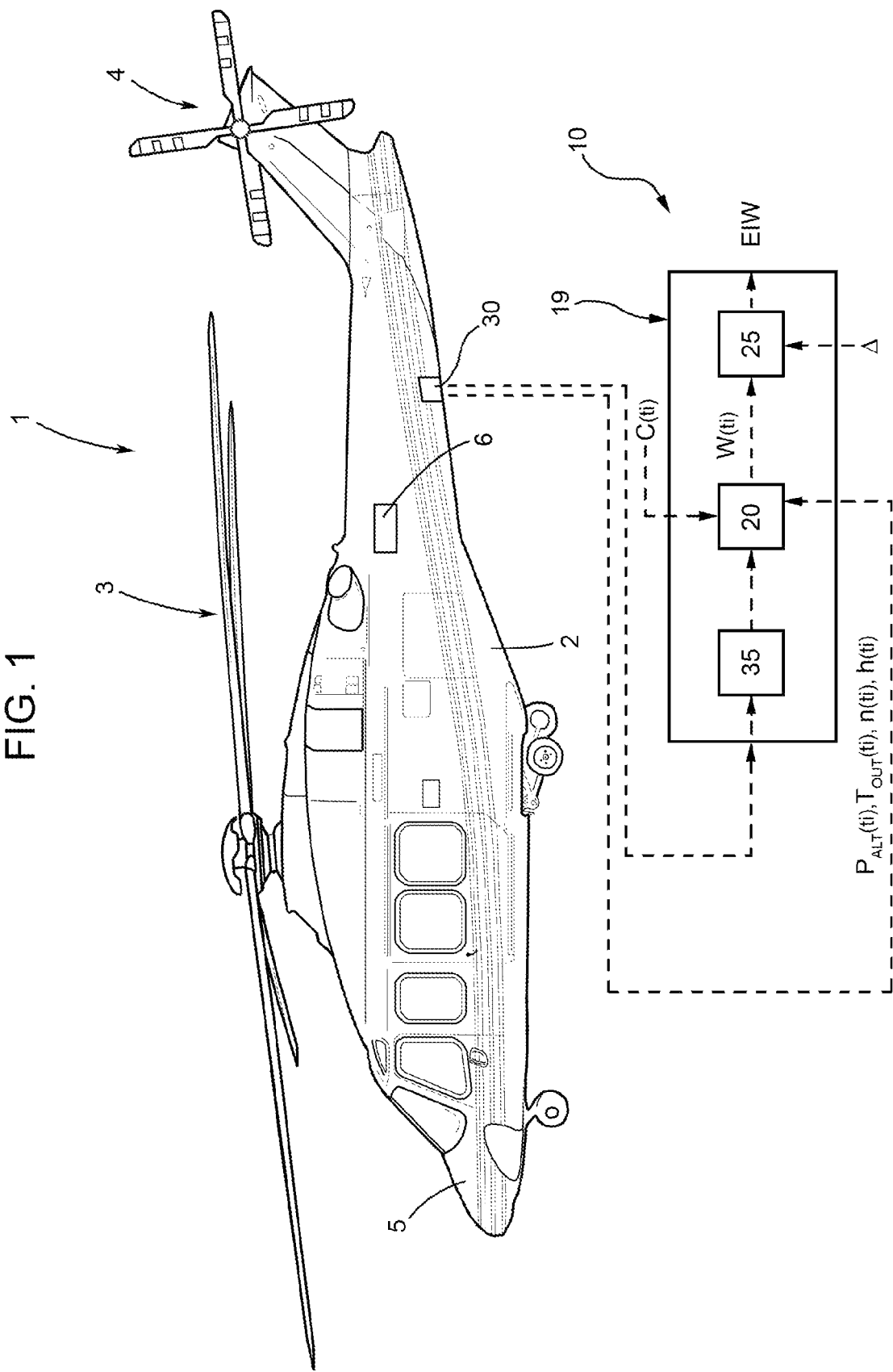
FIG. 1 shows an aircraft, in particular a helicopter, comprising a takeoff weight calculating system in accordance with the present invention, and implementing the takeoff weight calculating method according to the present invention.

Number 1 in FIG. 1 indicates an aircraft—in the example shown, a helicopter.

Helicopter 1 comprises a fuselage 2 with a nose 5; two engines 6 (only shown schematically in FIG. 1); and a main rotor 3 fitted to the top of fuselage 2 to generate the lift and thrust required to lift and propel helicopter 1.

Number 10 in FIG. 1 indicates a system for calculating the takeoff weight of helicopter 1.

System 10 advantageously comprises:

a recording stage 20 for recording values $W(t1)$, $W(t2)$, $W(t3)$, ..., $W(ti)$, ..., $W(tn)$ associated with the weight of helicopter 1 at a number of corresponding instants $t1$, $t2$, $t3$, ..., $ti$, ..., $tn$, in which helicopter 1 is in horizontal flight; and a calculating stage 25 for calculating the takeoff weight EIW of helicopter 1 on the basis of values $W(t1)$, $W(t2)$, $W(t3)$, ..., $W(ti)$, ..., $W(tn)$.

In the following description, horizontal flight is intended to mean a condition in which the helicopter is flying at substantially constant height and speed or hovering.

System 10 preferably also comprises:

an acquisition stage 30 for acquiring flight parameters, such as: roll angle, pitch angle, roll angle derivative, pitch angle derivative, yaw angle derivative, true airspeed of helicopter 1, load factor, radar-measured height, vertical speed, helicopter forward acceleration, landing-gear-on-ground indication, power and speed of engines 6, rotation speed of main rotor 3, and barometer-measured pressure altitude; and a flight condition recognition stage 35, which, on the basis of the acquired flight parameters, determines whether or not helicopter 1 is in stable horizontal flight.

Acquisition stage 30 is designed to acquire flight parameters at a given frequency, e.g. of 3 Hz.

Recognition stage 35 is designed to analyse the flight parameters acquired by acquisition stage 30, and to determine stable horizontal flight of helicopter 1 when some of the parameters acquired by acquisition stage 30 remain below respective threshold values for longer than a given time interval.

In the embodiment described, recognition stage 35 is designed to determine stable hovering of helicopter 1 when, for at least a time interval $\Delta t$,:

the roll angle is below a threshold value, e.g. of ten degrees;

the pitch angle is below a threshold value, e.g. of ten degrees;

vertical speed is below a threshold value, e.g. of 50 feet/minute;

radar-measured height is between a lower threshold value and an upper threshold value, e.g. of 5 and 100 feet;

the true airspeed of helicopter 1 is below 10 knots.

In the example described, time interval $\Delta t$ is at least three seconds.

Recording stage 20 is designed to record values $W(t1)$, $W(t2)$, $W(t3)$, ..., $W(ti)$, ..., $W(tn)$ at a number of instants $t1$, $t2$, $t3$, ..., $ti$, ..., $tn$, in which helicopter 1 is in a stable hovering condition at respective different or equal heights $h(t1)$, $h(t2)$, $h(t3)$, ..., $h(ti)$, ..., $h(tn)$.

More specifically, recording stage 20 is designed to receive the parameters acquired by acquisition stage 30; to record values $W(t1)$, $W(t2)$, $W(t3)$, ..., $W(ti)$, ..., $W(tn)$ associated with the weight of helicopter 1, if recognition stage 35 determines a stable hovering condition of helicopter 1; and to transmit values $W(t1)$, $W(t2)$, $W(t3)$, ..., $W(ti)$, ..., $W(tn)$ recorded at respective instants $t1$, $t2$, $t3$, ..., $ti$, ..., $tn$ to calculating stage 25.

Recording stage 20 is designed to record values $W(t1)$, $W(t2)$, $W(t3)$, ..., $W(ti)$, ..., $W(tn)$, for each stable hovering condition, on the basis of:

the pressure altitude and outside air temperature $PALT(ti)$, $TOUT(ti)$ recorded by on-board instruments at instant $ti$ and height $h(ti)$;

a factor $n(ti)$ proportional to the speed of engines 6 at instant $ti$ and height $h(ti)$;

the power Power(ti) generated by engines 6 at instant ti and height h(ti); and a number of performance curves 100, 101, 102, 103, 104 (FIGS. 2 and 3) stored in recording stage 20.

More specifically, recording stage 20 records, for each stable hovering condition, the following i-th parameters at instant ti and height h(ti):

$$\delta(ti) = \frac{p(ti)}{p_0} = \left[\frac{T_0 + h \cdot PALT(ti)}{T_0}\right]^m$$

and $$\psi(ti) = \frac{T(ti)}{T_0} = \frac{273.15 + TOUT(ti)}{T_0}$$

where:

$T_0 = 288.15[K]$ is the standard temperature at sea level;
$p_0$ is the standard pressure at sea level;
$h = -0.00198[k/ft]$;;

$$m = -\frac{g}{R \cdot h} = 5.25611;$$

R is the ideal gas universal constant; and
g is gravitational acceleration.

Recording stage 20 also records, on the basis of parameters $\delta(ti)$ and $\Psi(ti)$, a parameter $\sigma(ti)$ at instant ti and height h(ti):

$$\sigma(i) = \frac{\delta(ti)}{\psi(ti)} = \frac{\rho(ti)}{\rho_0}$$

where:

$\rho_0$ is standard density at sea level.

In performance curves 100, 101, 102, 103, 104 (FIGS. 2 and 3), the Y axis shows parameter:

$$\frac{Power(ti)}{\sigma(ti) \cdot n(ti)^3}$$

at instant ti and height h(ti); and the X axis parameter:

$$\frac{Weight(ti)}{\sigma(ti) \cdot n(ti)^2}$$

at instant ti and height h(ti), and wherein Weight(ti) is the weight of helicopter 1 at instant ti, obtained from performance curves 100, 101, 102, 103, 104.

Performance curves 100, 101, 102, 103, 104 are plotted for increasing hovering heights h(ti). In other words, performance curve 100 (101, 102, 103) is plotted for a lower hovering height h(i) than performance curve 101 (102, 103, 104).

Figure 3:
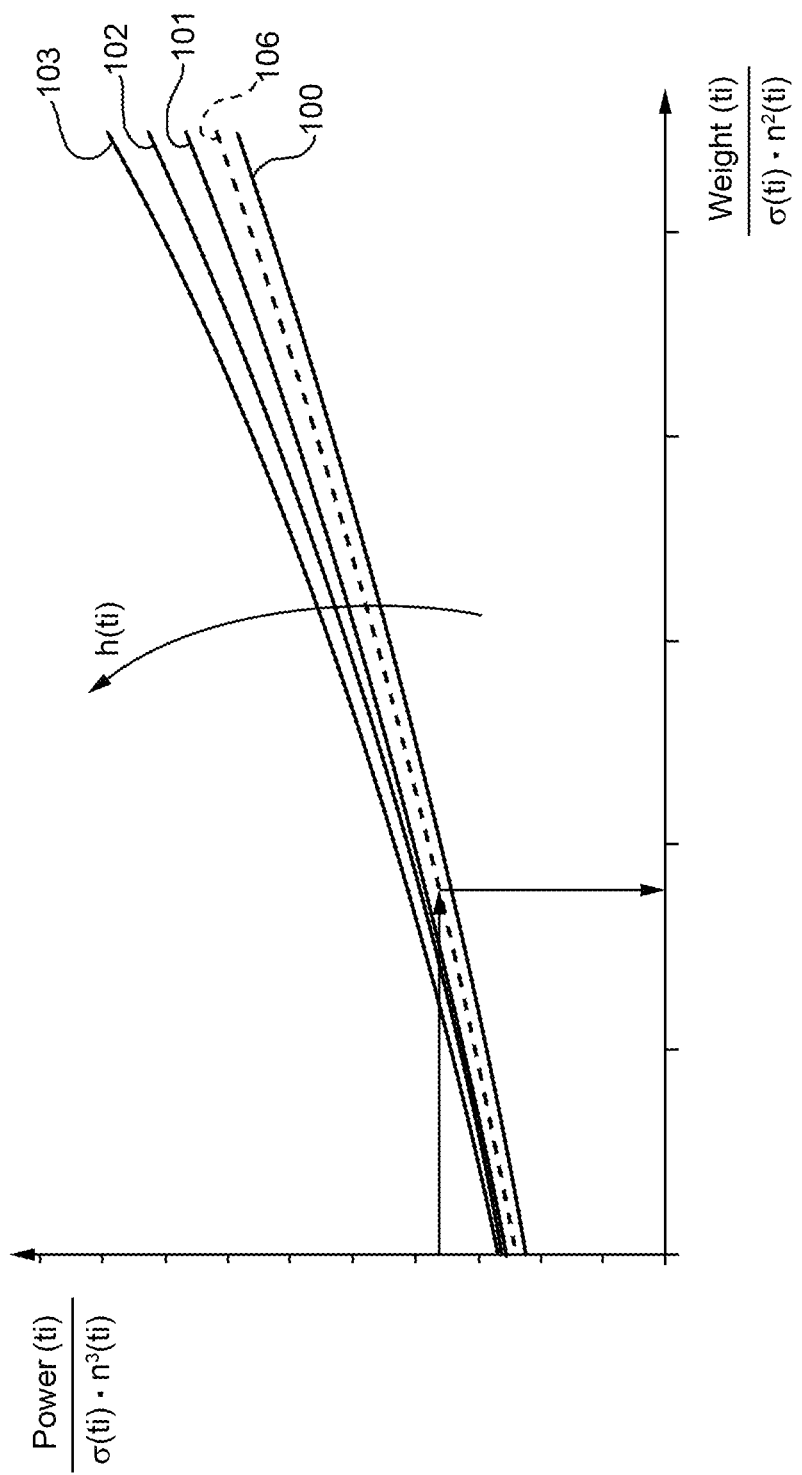
FIG. 3 shows interpolation of the FIG. 2 characteristic curve.

Recording stage 20 is designed to interpolate a performance curve 106 (FIG. 3) at height h(ti), in the event this does not coincide with any of the heights at which performance curves 100, 101, 102, 103 are plotted. In FIG. 3, performance curve 106 is interpolated at a height h(ti) between the heights of performance curves 100 and 101.

Recording stage 20 is designed to calculate each value W(t1), W(t2), W(t3), ..., W(ti), ..., W(tn) at respective instant ti according to the equation:

$$W(ti) = \text{Weight}(ti) + C(ti)$$

where correction values C(t1), C(t2), ..., C(ti), ..., C(tn) are the sum of:

respective first addends associated with fuel consumption up to instant t0, t1, ..., ti, ..., tn; and respective crew-entered second addends associated with changes in weight, e.g. as a result of loading and unloading material on and off helicopter 1.

Calculating stage 25 is designed to calculate the weight EIW of helicopter 1 according to the equation:

$$EIW = \sum_{ti=1}^{m} \frac{W(ti)}{m} + \Delta$$

where:

$\Delta$ is a safety value added to the calculated weight EIW of helicopter 1.

In other words, calculating stage 25 is designed to calculate the weight EIW of the helicopter as the sum of the arithmetic mean of values W(ti) and a safety value $\Delta$.

Recording stage 20 is preferably designed to determine a malfunction when, at a given instant ti+1,:

$$W(ti+1) - W(ti) \geq \Delta$$

In other words, calculating stage 25 is designed to determine a malfunction when the difference between two consecutive values W(ti), W(ti+1) recorded at instants ti and ti+1 exceeds safety value $\Delta$.

In which case, calculating stage 25 sends a malfunction signal to a maintenance unit of system 10 and/or deletes values W(ti+1, ti+2, ... ) from the calculation of weight EIW.

Recording, calculating, and recognition stages 20, 25, 35 are preferably located at a ground station 19, and acquisition stage 30 is located on helicopter 1.

The flight parameters acquired by acquisition stage 30 are downloaded to calculating stage 25, e.g. by means of a data transfer cassette.

Recording, calculating, acquisition, and recognition stages 20, 25, 30, 35 are controlled by software loaded and executed on system 10.

In actual use, the flight parameters are acquired by acquisition stage 30 at the given sampling frequency, and are downloaded to the ground-based recognition stage 35, which determines whether helicopter 1 is hovering.

More specifically, recognition stage 35 determines stable hovering of helicopter 1 when, at least throughout interval $\Delta t$,:

the roll angle is below a threshold value, e.g. of ten degrees;
the pitch angle is below a threshold value, e.g. of ten degrees;
vertical speed is below a threshold value, e.g. of 50 feet/minute;
radar-measured height is between a lower threshold value and an upper threshold value, e.g. of 5 and 100 feet;
the true airspeed of helicopter 1 is below 10 knots.

For each instant ti and height h(ti) at which recognition stage 35 determines a stable hovering condition, recording stage 20 records a weight value W(ti) of helicopter 1.

More specifically, on the basis of the i-th values of pressure altitude PALT(ti) and temperature TOUT(ti) at height h(ti) and instant t(i), recording stage 20 records parameters:

$$\delta(ti) = \frac{p(ti)}{p_0} = \left[\frac{T_0 + h \cdot PALT(ti)}{T_0}\right]^m$$

and $$\psi(i) = \frac{T(ti)}{T_0} = \frac{273.15 + TOUT(ti)}{T_0}.$$

Next, recording stage 20 records parameter:

$$\sigma(i) = \frac{\delta(ti)}{\psi(ti)} = \frac{\rho(ti)}{\rho_0}$$

Figure 2:
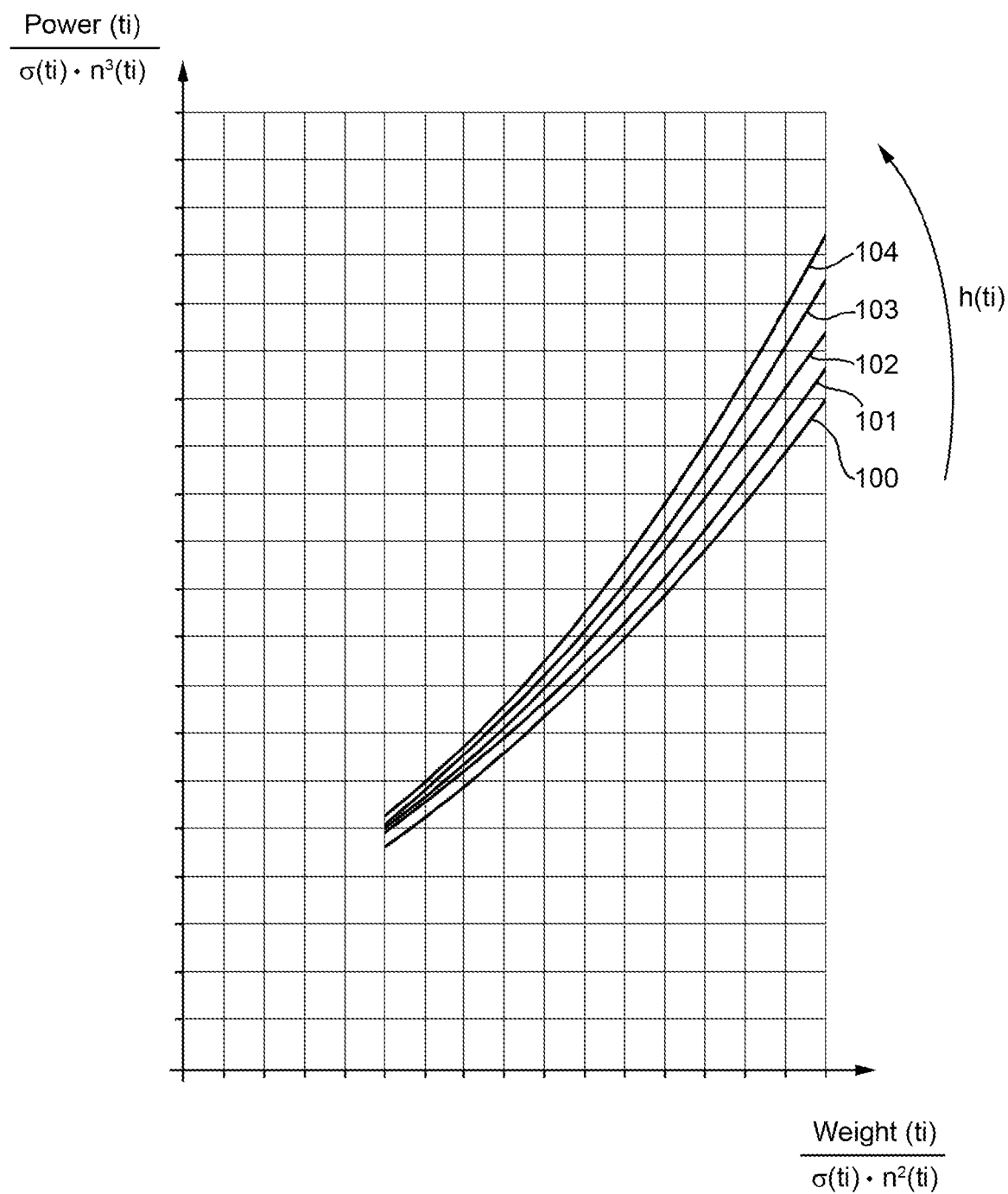
FIG. 2 shows a characteristic curve employed in the FIG. 1 system.

At this point, given parameters σ(ti), n(ti), power draw value Power(ti), and height h(ti), weight value Weight(ti) can be obtained from performance curves 100, 101, 102, 103, 104 in FIGS. 2 and 3.

Recording stage 20 corrects the Weight(ti) value by applying correction values C(ti), associated with fuel consumption between instant ti−1 and t, and material loading/unloading operations, according to the equation:

$$W(ti) = \text{Weight}(ti) + C(ti)$$

The value W(ti) associated with height h(ti) and instant ti is sent to calculating stage 25.

Calculating stage 25 thus receives a number of values W(t1), W(t2), W(t3), . . . , W(ti), . . . , W(tn) associated with weight values recorded at respective instants t1, t2, t3, . . . , ti, . . . , tn and respective heights h(t1), h(t2), h(t3), . . . , h(ti), . . . , h(tn).

Calculating stage 25 calculates the takeoff weight EIW of helicopter 1, taking into account a safety value Δ. More specifically, takeoff weight EIW is calculated according to the equation:

$$EIW = \sum_{ti=1}^{m} \frac{W(ti)}{m} + \Delta$$

Calculating stage 25 generates a signal indicating a malfunction of system 10, when, at instant t(i+1):

$$W(ti+1) - W(ti) \geq \Delta$$

In which case, calculating stage 25 does not take values W(ti+2), W(ti+3), . . . , W(tn) into account in calculating the takeoff weight EIW of helicopter 1.

The advantages of the method and system 10 according to the present invention will be clear from the above description.

In particular, the method and system 10 according to the present invention enable the takeoff weight EIW of helicopter 1 to the calculated during operation of helicopter 1.

The takeoff weight EIW can thus be used effectively, especially in combination with a significant indication of the flight manoeuvres actually performed by helicopter 1, to assess the actual fatigue and, hence, the actual residual working life of the most significant component parts of helicopter 1.

Moreover, the method and system 10 according to the invention provides for measuring the actual takeoff weight of helicopter 1 easily, with no need for on-board load sensors.

Finally, another important point to note is that, in stable hovering mode, the power Power(ti) necessary for flight is substantially used to lift the weight of helicopter 1.

Performance curves 100, 101, 102, 103, 104 are therefore easy to plot, and normally shown in the operating manual of helicopter 1.

By employing the measurement of the power Power(ti) drawn in stable hovering mode at height h(ti), the method according to the invention is extremely easy to implement using performance curves 100, 101, 102, 103, 104.

Clearly, changes may be made to the method and system 10 as described herein without, however, departing from the scope of the present invention.

Finally, the aircraft may be a convertiplane.

The invention claimed is:

1. A method of calculating a takeoff weight (EIW) of an aircraft (1) capable of hovering, characterized by comprising the steps of:
   recording at least one first and one second value (W(t1), W(t2), W(t3), . . . , W(ti), . . . , W(tn)) of a first quantity associated with the take-off weight of said aircraft at at least one first instant and second instant (t1, t2, t3, . . . , ti, . . . , tn), in which said aircraft (1) is in a stable hovering condition; and
   calculating the takeoff weight (EIW) of said aircraft (1) on the basis of said first and second values (W(t1), W(t2), W(t3), . . . , W(ti), . . . , W(tn));
   said recording step comprising the steps of:
   recording a necessary hovering power (Power(t1), Power(t2), Power(t3), . . . , Power(ti), . . . , Power(tn)) at said first and second instant (t1, t2, . . . , ti, . . . , tn); and
   acquiring third values (PALT(t1), PALT(t2), . . . , PALT(ti), . . . , PALT(tn)) of a second quantity associated with a pressure at a flying height (h1, h2, . . . , h(i), . . . , h(n)) at said first and second instant (t1, t2, . . . , ti, . . . , tn);
   acquiring fourth values (TOUT(t1), TOUT(t2), . . . , TOUT(ti), . . . , TOUT(tn)) of a third quantity associated with a temperature at the flying height (h1, h2, . . . , h(i), . . . , h(n)) at said first and second instant (t1, t2, . . . , ti, . . . , tn);
   acquiring fifth values (n(t1), n(t2), . . . , n(ti), . . . , n(tn)) of a fourth quantity associated with a speed of an engine (6) of said aircraft (1) at said first and second instant (t1, t2, . . . , ti, . . . , tn);
   calculating, on the basis of said third, fourth and fifth values (PALT(t1), PALT(t2), . . . , PALT(ti), . . . , PALT(tn); TOUT(t1), TOUT(t2), . . . , TOUT(ti), . . . , TOUT(tn);
   n(t1), n(t2), . . . , n(ti), . . . , n(tn)), sixth values (σ(t1), σ(t2), . . . , σ(ti), . . . σ(tn)) of a fifth quantity associated with a relative density at the flying height (h1, h2, . . . , h(i), . . . , h(n)) at said first and second instant (t1, t2, . . . , ti, . . . , tn);
   using a hovering performance curve (100, 101, 102, 103) to calculate seventh and eight values of gross-weight (Weight(t1), Weight(t2), Weight(t3), . . . , Weight(ti), . . . , Weight(tn)) of said aircraft (1) at said first and second instant (t1, t2, . . . , ti, . . . , tn);
   said hovering performance curve (100, 101, 102, 103) showing the pattern of a first parameter, associated with said necessary hovering power (Power(t1), Power(t2), Power(t3), . . . , Power(ti), . . . , Power(tn)), as a function of a second parameter associated with said gross-weight (Weight(t1), Weight(t2), Weight(t3), . . . , Weight(ti), . . . , Weight(tn)) of said aircraft (1);

said first parameter being:

$$\frac{\text{Power}(ti)}{\sigma(ti) \cdot n(ti)^3}$$

where σ(ti) are said sixth values, and
n(ti) are said fifth values;
said second parameter being:

$$\frac{\text{Weight}(ti)}{\sigma(ti) \cdot n(ti)^2};$$

said recording step further comprising the steps of:
correcting said seventh and eight values of gross weights (Weight(t1), Weight(t2), Weight(t3), . . . , Weight(ti), . . . , Weight (tn)) at said first and second instant (t1, t2, . . , ti, . . tn) with a first and a second correction values (C(t1), C(t2), C(t3), . . . , C(ti), . . . , C(tn)), according to the formula:

$$W(ti) = \text{Weight}(ti) + C(ti);$$

where W(t1), W(t2), .. W(ti), . . , W(tn) are said first and second value;
said first and second correction values (C(t1), C(t2), C(t3), . . . , C(ti), . . . , C(tn)) comprising at least one first addend associated with fuel consumption of said aircraft up to said first instant and second instant (t1, t2, t3, . . . , ti, . . . , tn);
said calculating step further comprising the step of calculating said takeoff weight (EIW) according to the equation:

$$EIW = \sum_{ti=1}^{m} \frac{W(ti)}{m} + \Delta$$

where Δ is a safety value.

2. A method as claimed in claim 1, wherein said recording step comprises the substeps of:
recording said first value (W(t1)) of said first quantity at a first height (h(t1)); and
recording said second value (W(t2)) of said first quantity at a second height (h(t2)) different from said first height (h(t1)).

3. A method as claimed in claim 1, further comprising the steps of:
acquiring a number of flight parameters;
identifying a stable horizontal flight condition of said aircraft (1) on the basis of said flight parameters; and
executing said recording step if said aircraft (1) is in said stable horizontal flight condition.

4. A method as claimed in claim 3, wherein said number of flight parameters comprise a roll angle, pitch angle, vertical speed, radar-measured height, and true airspeed of said aircraft (1);
said identifying step comprising the step of determining that, for at least a given time interval (Δt):
said roll angle is below a respective threshold value;
said pitch angle is below a respective threshold value;
said vertical speed is below a respective threshold value;
said radar-measured height is between respective threshold values; and
said true airspeed is below a respective threshold value.

5. A method as claimed in claim 3, characterized by comprising the step of downloading the acquired said flight parameters to a ground-based station (19);
and in that at least one of said identifying/recording/calculating steps is performed at said ground-based station (19).

6. A method as claimed in claim 1, wherein said first correction value (C(t1), C(t2), C(t3), . . . , C(ti), . . . , C(tn)) comprises a second addend entered by a user on said aircraft (1), and associated with a change in weight independent of said fuel consumption.

7. A method as claimed in claim 1, wherein said recording step comprises the step of generating a malfunction signal when the difference between said first and second value (W(ti), W(ti+1), . . . , ) recorded at consecutive respective said first and second instants (ti, ti+1) exceeds a further threshold value (Δ).

8. A software product loadable onto a control unit and designed, when executed, to implement the steps of a method as claimed in claim 1.

9. A system (10) for calculating a takeoff weight (EIW) of an aircraft (1) capable of hovering, the system being characterized by comprising:
a recording stage (20) for recording at least one first and second value (W(t1), W(t2), W(t3), . . . , W(ti), . . . , W(tn)) of a quantity associated with takeoff weight of said aircraft at at least one first and second instant (t1, t2, t3, . . . , ti, . . . , tn) in which said aircraft (1) is in a stable hovering condition; and
a calculating stage (25) for calculating the takeoff weight (EIW) of said aircraft (1) on the basis of said first and second values (W(t1), W(t2), W(t3), . . . , W(ti), . . . , W(tn));
said recording stage (20) being designed to record a first and a second values of gross-weight (Weight(t1), Weight (t2), Weight(t3), . . . , Weight(ti), . . . , Weight (tn)), on the basis of:
a necessary hovering power (Power(t1), Power(t2), Power (t3), . . . , Power(ti), . . . ,Power(tn)) at said first and second instant (t1, t2, . . . , ti, . . . , tn);
third values (PALT(t1), PALT(t2), . . . , PALT(ti), . . . , PALT(tn)) of a second quantity associated with a pressure at a flying height (h1, h2, . . . , h(i), . . . , h(n)) at said first and second instant (t1, t2, . . . , ti, . . . , tn);
fourth values (TOUT(t1), TOUT(t2), . . . , TOUT(ti), . . . , TOUT(tn)) of a third quantity associated with a temperature at the flying height (h1, h2, . . . , h(i), . . . , h(n)) at said first and second instant (t1, t2, . . . , ti, . . . , tn);
fifth values (n(t1), n(t2), . . . , n(ti), . . . , n(tn)) of a fourth quantity associated with a speed of an engine (6) of said aircraft (1) at said first and second instant (t1, t2, . . . , ti, . . . , tn); and
a number of performance curves (100, 101, 102, 103) showing the pattern of a first parameter, associated with said necessary hovering power (Power(t1), Power(t2), Power(t3), . . . , Power(ti), . . . , Power(tn)), as a function of a second parameter associated with said gross-weight (Weight(t1), Weight(t2), Weight(t3), . . . , Weight(ti), . . . , Weight (tn)) of said aircraft (1);
said first parameter being:

$$\frac{\text{Power}(ti)}{\sigma(ti) \cdot n(ti)^3}$$

where σ(ti) are sixth values, and n(ti) are said fifth values;
said second parameter being:

$$\frac{\text{Weight}(ti)}{\sigma(ti) \cdot n(ti)^2};$$

said recording stage (20) being designed to correct said first and said second value of said gross-weight (Weight (t1), Weight(t2), Weight(t3), ..., Weight(ti), ..., Weight (tn)) at said first and second instant (t1, t2, ..., ti, ... tn), with a first and a second correction values (C(t1), C(t2), C(t3), ..., C(ti), ..., C(tn)), according to the formula:

$$W(ti) = \text{Weight}(ti) + C(ti);$$

first and second value;
said first and second correction values (C(t1), C(t2), C(t3), ..., C(ti), ..., C(tn)) comprising at least one first addend associated with the fuel consumption of said aircraft up to said first instant and second instant (t1, t2, t3, ..., ti, ..., tn);

said calculating stage (25) being designed to calculate said takeoff weight (EIW) according to the equation:

$$EIW = \sum_{ti=1}^{m} \frac{W(ti)}{m} + \Delta$$

where Δ is a safety value.

10. A system as claimed in claim 9, further comprising an acquisition stage (30) for acquiring flight parameters of said aircraft (1);
said calculating stage (25) being designed to also calculate the takeoff weight (EIW) on the basis of said flight parameters;
said system further comprising a flight condition recognition stage (35) designed to determine, on the basis of the acquired flight parameters, whether or not said aircraft (1) is in stable horizontal flight.

11. A system as claimed in claims 9, wherein said calculating stage (25) and/or said recording stage (20) are/is ground-based.

\* \* \* \* \*